United States Patent
Ward (10) Patent No.: US 8,193,984 B2
(45) Date of Patent: Jun. 5, 2012

(54) CALIBRATION OF A LOCATION SYSTEM

(75) Inventor: Andrew Martin Robert Ward, Great Shelford (GB)

(73) Assignee: Ubisense Limited, Cambridge (GB)

( * ) Notice: Subject to any disclaimer, the term of this patent is extended or adjusted under 35 U.S.C. 154(b) by 715 days.

(21) Appl. No.: 12/297,751

(22) PCT Filed: Apr. 19, 2007

(86) PCT No.: PCT/GB2007/001425
§ 371 (c)(1),
(2), (4) Date: Nov. 25, 2008

(87) PCT Pub. No.: WO2007/122394
PCT Pub. Date: Nov. 1, 2007

(65) Prior Publication Data
US 2009/0079633 A1    Mar. 26, 2009

(30) Foreign Application Priority Data
Apr. 20, 2006 (GB) .................................. 0607864.6

(51) Int. Cl.
*G01S 5/12* (2006.01)
(52) U.S. Cl. ....................... 342/387; 342/465
(58) Field of Classification Search ................ 342/387, 342/465
See application file for complete search history.

(56) References Cited

U.S. PATENT DOCUMENTS

| | | | |
|---|---|---|---|
| 5,469,409 A * | 11/1995 | Anderson et al. ............... 368/10 |
| 5,758,288 A | 5/1998 | Dunn et al. |
| 5,917,449 A | 6/1999 | Sanderford et al. |
| 5,973,643 A | 10/1999 | Hawkes et al. |
| 6,430,416 B1 | 8/2002 | Loomis |
| 7,190,271 B2 * | 3/2007 | Boyd ......................... 340/572.4 |
| 2004/0072582 A1* | 4/2004 | Aljadeff et al. ............ 455/456.1 |
| 2005/0175038 A1* | 8/2005 | Carlson et al. ................ 370/503 |
| 2006/0125695 A1 | 6/2006 | Kennedy, Jr. et al. |

FOREIGN PATENT DOCUMENTS
WO    WO2004036924 A2 *    4/2004
* cited by examiner

*Primary Examiner* — Gregory C Issing
(74) *Attorney, Agent, or Firm* — Rothwell, Figg, Ernst & Manbeck, P.C.

(57) ABSTRACT

A location system comprising a plurality of base units for enabling the locating of a device by means of one or more location signals communicated between the device and the base units and signal processing equipment for: i. determining the location of the device in dependence on the manner in which the location signal(s) is/are received and ii. deriving calibration data for calibrating the system in dependence on the manner in which the location signal(s) is/are received.

19 Claims, 3 Drawing Sheets

CALIBRATION OF A LOCATION SYSTEM

CROSS REFERENCE TO RELATED APPLICATION(S)

This application is a 35 U.S.C. §371 National Phase Entry Application from PCT/GB2007/001425, filed Apr. 19, 2007, designating the United States and also claims the benefit of Patent Application No. GB 0607864.6 filed Apr. 20, 2006, the disclosures of which are incorporated herein in their entirety by reference.

BACKGROUND

The invention relates to a location system capable of deriving calibration information from location signals received from a device to be located by the system. In particular, the calibration information defines a time offset in the clock of each receiver of the system.

Infrastructure-based location systems use items of equipment placed at known points in the environment to determine the positions of other objects in that environment. Uses of such systems include the tracking of pallets within warehouses, finding colleagues in a workplace environment, and monitoring the positions of soldiers during a training exercise.

Typically, these location systems operate by placing a tag transmitter device on the object(s) to be tracked. These tags transmit signals which allow the tag location, and hence the object location, to be determined. Typically, the signals are coded in some way to allow the positions of different tags in the same space to be determined. The signals may be radio waves, light waves, ultrasonic waves, etc. The infrastructure consists of a set of base units, each having a receiver for determining particular qualities of the incoming signals from tags that allow the tag location to be determined.

In many location systems, the receivers detect the time-of-arrival ($t_a$) of the incoming signal. If the receiver knows the precise time-of-transmission of the signal ($t_t$), and the speed of the signal through the environment (v), it is possible to determine the distance (d) between the receiver and the tag, using the equation $$d = v(t_a - t_t)$$

As mentioned above, the positions of the receivers (i.e. the base units) are known, and if four or more distances from different non-coplanar receivers to the tag can be found in this way, then a unique 3D position for the tag can be found using a process known as trilateration (closely allied to the better-known process of triangulation). Systems that work in this way are known as time-of-arrival (TOA) systems, and a TOA system based on ultrasonic techniques is described in the paper "A New Location Technique for the Active Office", A. Ward, A. Jones, and A. Hopper. IEEE Personal Communications, 4(5):42-47, October 1997.

In fact, typically the receivers in the location system do not know the precise time-of-transmission of the signal from the tag. Achieving synchronisation of the tag with the infrastructure requires expensive and power-hungry circuitry at the tag and this is normally in conflict with the requirement that the tag should be unobtrusive, inexpensive and battery-powered (with a very long battery life). Therefore, a different approach called time-difference-of-arrival (TDOA) location may be used.

In a TDOA location system, there is no need for precise synchronisation of the tags and the receivers. Instead, all elements of the receiver infrastructure are precisely synchronized, using stable clocks at each receiver that are periodically corrected via some wired or wireless reference timing signal that is distributed to the receivers. If the receivers are synchronized (so that an event determined by one receiver as occurring at time t would also be determined by all other receivers as occurring at time t) then it is possible to find information about the tag's position by comparing the differences of the signal's time-of-arrival at multiple receivers. For example, suppose the signal was transmitted at an unknown time $t_t$ and received at times $t_{a1}$ and $t_{a2}$ at receivers 1 and 2 respectively. Then, we can find the difference, $d_{\Delta 12}$, between the distances from receiver 1 to the tag and receiver 2 to the tag, as follows:

$$d_{\Delta 12} = v(t_{a1} - t_t) - v(t_{a2} - t_t)$$

$$= v(t_{a1} - t_{a2})$$

As can be seen, the (unknown) time of transmission is not required to determine the distance difference $d_{\Delta 12}$.

Since the positions of the receivers are known, this equation describes a hyperboloid of revolution, on which (at some point) the tag may be found. By repeating this process with other receiver pairs and determining the locus of points where the derived hyperboloids of revolution intersect, the possible 3D position of the tag can be narrowed down. If four or more non-coplanar receivers detect the signal from the tag, then the intersection of the derived hyperboloids of revolution will represent a unique solution for the tag's 3D position. One implementation of a TDOA location system is described in the paper "Commercialization of an Ultra Wideband Precision Asset Location System", R. J. Fontana, E. Richley, J. Barney, Proceedings of the 2003 IEEE Conference on Ultra Wideband Systems and Technologies, November 2003, Reston, Va.

In some location systems, the receivers may detect the angle-of-arrival (AOA) of the incoming signal from the tag. One way (but not the only way) for the receiver to accomplish this is to look for phase differences of the incoming signal at multiple antennas in the receiver unit. For example, a single receiver unit with four coplanar (but non-linear) antennas could get a 2D bearing for the tag in azimuth and elevation. By combining the 2D bearing information from two or more receiver units, a 3D position for the tag can be computed. Note that no synchronisation between receiver units is required to use AOA location techniques, although both the position and orientation of the fixed receiver units must be determined when the infrastructure is surveyed.

The TDOA and AOA techniques may be combined, for greater system robustness. When both techniques are used, a computer system gathers all the available TDOA and AOA data from the receivers that detected a tag's signal and uses them to compute a solution for the tag position best matching the input data. The system may attribute different weights to each item of data used in the position calculation.

Some infrastructure-based location systems use both TDOA and AOA techniques. Clocks at different receivers in such a hybrid location system also need to be synchronized because, as noted above, if TDOA location techniques are to be used the receivers in the location system infrastructure must be synchronized.

One method of achieving synchronisation between the receivers is to equip each receiver with a perfect clock. If these perfect clocks were gathered in one place, adjusted so that all were exactly synchronized and taken to the receivers, then each receiver could determine the time of arrival of signals in the common receiver time frame using its (now local) clock.

In practice, this approach would have a number of problems. First, perfect clocks do not exist. Real clocks drift relative to each other and therefore even if the clocks were adjusted to be exactly synchronous at one point in time, they would start to drift out of synchronisation. Second, it might well be difficult to move the clocks to one point in space so they could be synchronised locally.

Both problems can be solved by using a clock at each receiver which is periodically corrected by an external timing reference signal. If the clock at the receiver is stable enough and/or the corrections via the external reference signal are frequent enough, then the drift in the receiver's clock relative to those of the other receivers can be kept sufficiently low that the impact of any such drift on the location performance of the system is negligible.

Typically, the external timing reference is generated using a single clock located at one point and the signal from that clock is distributed, via wires or wirelessly to each of the receivers. In some cases, the external timing reference signal arriving at a receiver may be used to make an adjustment to a local clock on the receiver, or it may be used directly as the local clock.

Transmission of the external timing reference signal to the receiver is not instantaneous and this propagation time may well need to be taken into account, particularly with systems where the measurement signal transmitted by the tag is electromagnetic. In these cases, a very small clock offset at one of the receivers can translate into a large positioning error. This propagation time, represents an extra unknown (one for each receiver) in the system — it may be accounted for directly (if known) by suitably adjusting the local clock of the relevant receiver (if the local clock mechanism accommodates a mechanism for making such a change), or more commonly it may be accounted for during the position calculation process where propagation times represent further unknowns (one for each receiver) in the system of equations relating measurements to the position of the tag.

In situations where the speed of propagation of the external timing reference signal $v_p$ through its distribution medium is known, one way of determining the propagation delay $t_p$ from a fixed external timing reference signal to each receiver is to determine the physical distance $d_p$ from the reference source to each receiver and to calculate the propagation delay as follows:

$$t_p = d_p/v_p$$

U.S. Pat. No. 6,054,950 describes a TDOA location system in which an ultra-wideband radio synchronisation pulse is transmitted from a reference station placed at a known point to a set of receivers also placed at known points in the environment, allowing the local clocks at each receiver to be globally synchronised with other receivers via the above mechanism. However, this approach has the disadvantage that not only must the positions of the receiver units be known in advance of system operation, so must the position of the external timing reference signal generator.

An alternative synchronisation scheme involves distribution of the external timing reference signal over a wired network. Here, the propagation delay depends on the length of the wires distributing the signal to each receiver (which may not be known because it may be desirable to route the signal over an existing network within a building and it may not be possible to directly measure the cable lengths) and the type of cable. However, even in situations where it is possible to use some external mechanism to determine the propagation delay along the cable at one point in time, temperature changes in the building can cause the properties of the cable (such as its length) to vary significantly, altering the propagation delay.

There is therefore a need for an improved scheme for calibrating a location system.

SUMMARY

According to one embodiment of the invention, there is provided a location system comprising a plurality of base units for enabling the locating of a device by means of one or more location signals communicated between the device and the base units, and signal processing equipment for: i. determining the location of the device in dependence on the manner in which the location signal(s) is/are received; and ii. deriving calibration data for calibrating the system in dependence on the manner in which the location signal(s) is/are received.

Preferably the location signal(s) is/are conveyed as a time-varying waveform and the location signal(s) in dependence on which the location of the device is determined and the location signal(s) in dependence on which the calibration data is derived are contemporaneous parts of the waveform.

The calibration data preferably defines a timing offset in the clocking of each base unit relative to a reference clock. The system may comprise a central clock and each base unit may receive a timing signal from the central clock for clocking the base unit.

Preferably the system is arranged to calibrate itself in dependence on the calibration data. The system may be arranged to calibrate the clocking of each base unit in dependence on the calibration data. According to one embodiment, the signal processing equipment is arranged to determine an average timing offset for a base unit from successive location signals communicated between the device and the base unit and the base unit is arranged to calibrate its clocking in dependence on the average offset.

The base units are preferably arranged to determine the time-of-arrival of one or more location signal(s) as received by the base units. Preferably, the signal processing equipment is arranged to determine the location of the device in dependence on the time of arrival of the one or more location signals at each of the base units and the timing offset in the clocking of each base unit as defined by the calibration data.

The signal processing equipment may be arranged to store calibration data derived from a location signal communicated at a first point in time and to determine the location of a device at a second, subsequent point in time in dependence on the timing offsets defined by the stored calibration data and the manner in which one or more location signals communicated at the second point in time is/are received.

Preferably, the signal processing equipment is arranged to determine the location of the device by means of two different location schemes. The signal processing equipment may be arranged to determine the location of the device in dependence on the time-difference-of-arrival and angle-of-arrival of the location signals as received by the base units. The signal processing equipment may be arranged to determine the location of the device and the calibration data in dependence on the time-difference-of-arrival and angle-of-arrival of the location signals as received by the base units.

According to one embodiment, the base units are arranged to determine the angle-of-arrival of one or more location signal(s) as received by the base units.

Preferably the calibration data is determined independently of any reference timing generator external to the base units and the device, and the position thereof.

According to a second embodiment of the invention, there is provided a method for locating a device in a location system comprising the device and a plurality of base units for enabling the locating of the device, the method comprising the steps of: communicating one or more location signals between the device and the base units; determining the location of the device in dependence on the manner in which the location signal(s) is/are received; and deriving calibration data for calibrating the system in dependence on the manner in which the location signal(s) is/are received.

Preferably, the calibration data defines a timing offset in the clocking of each base unit relative to a reference clock.

The method may comprise clocking each base station by means of a timing signal provided by a central clock.

Preferably, the method comprises calibrating the system in dependence on the calibration data. The method may comprise calibrating the clocking of each base unit in dependence on the calibration data.

The method may comprise determining an average timing offset for a base unit from successive location signals communicated between the device and the base unit and calibrating the clocking of the base unit in dependence on the average offset.

Preferably, the method comprises determining the time-of-arrival of one or more location signal(s) as received by the base units. The method preferably comprises determining the location of the device in dependence on the time of arrival of the one or more location signals at each of the base units and the timing offset in the clocking of each base unit as defined by the calibration data.

The method may comprise storing calibration data derived from a location signal communicated at a first point in time and determining the location of a device at a second, subsequent point in time in dependence on the timing offsets defined by the stored calibration data and the manner in which one or more location signals communicated at the second point in time is/are received.

Preferably, the method comprises determining the location of the device by means of two different location schemes. According to one embodiment, the method comprises determining the location of the device in dependence on the time-difference-of-arrival and angle-of-arrival of the location signals as received by the base units.

Preferably, the method comprises determining the angle-of-arrival of one or more location signal(s) as received by the base units.

BRIEF DESCRIPTION OF THE DRAWINGS

The present invention will now be described by way of example with reference to the accompanying drawings.

DETAILED DESCRIPTION

The invention relates to a location system that is capable of deriving calibration information from location signals that are received by the system from a device to be located. In particular, embodiments of the invention use redundant measurement information gathered by a hybrid TDOA-AOA system to determine unknown clock offsets at receivers on an ongoing basis during system operation. The clock offsets can then be used in the subsequent operation of the TDOA-AOA system to improve system accuracy and reliability.

It can be seen that such a system is an improvement over the state of the art discussed above, because:

1. If a wireless timing signal distribution mechanism is used, it does not require a dedicated timing reference signal generator having a fixed, known location; this means that the timing reference generator can be moved between different points in the environment according to what is convenient, without the location of the timing reference generator being needed to be determined explicitly, and;
2. It is able to periodically recalibrate clock offsets in other systems (such as those involving distribution of a timing signal over a wired network) where the propagation delay between the timing reference signal generator and the receiver units might be expected to change over time; this means that the accuracy of the position estimates generated by the system can be improved, as the time varying clock offsets can be incorporated into the position estimate calculation.

In a 3-dimensional hybrid TDOA-AOA system, each receiver detecting the signal from a tag reports three measurements: the time-of-arrival $t_a$ of the tag signal at the receiver and a bearing for the tag in azimuth ($\theta$) and elevation ($\phi$). The unknowns in the system are the x, y, and z coordinates and time of transmission $t_t$ associated with the tag state and one unknown (the local clock propagation delay $T_p$ from the clock source) associated with each receiver. As stated previously, the local clock propagation delays, once determined, are intended to be used in subsequent operation of the TDOA-AOA system. As such, they can be referenced to any epoch (i.e. to any point in time), which does not necessarily have to be that of the clock source. This is because when the clock propagation delays are used for time-difference-of-arrival calculations they are essentially compared against each other, and any consistent shift in the receiver clocks is irrelevant. Hence, as long as the epoch used is consistent for all clock propagation delays, the time-difference-of-arrival analysis will be correct. Bearing this in mind, and considering that knowing the time of transmission $t_t$ of the signal from the tag is not normally useful, it is preferable to determine the unknown local clock propagation delay relative to the time of transmission of the signal from the tag, $t_p$. By combining the tag time of transmission $t_t$ into the clock offsets in this way, it is no longer necessary to treat this variable as an independent unknown in the position calculation.

If n receivers detect the signal from the tag, there are then a total of 3n measurements ($t_{a1} \ldots t_{an}$, $\theta_1 \ldots \theta_n$ and $\phi_1 \ldots \phi_n$) and a total of n+3 unknowns (x, y, z, and $t_{p1} \ldots t_{pn}$) in the system. So when the number of receivers detecting the tag's signal is two or more, the number of unknowns is less than or equal to the number of measurements. Therefore, assuming that the receivers and tag are not in a degenerate configuration (i.e. collinear), estimates for all the unknown values can be determined by using the measured values together with known constants, such as the 3D positions and orientations of the receiver units. Estimates for the unknown values can be determined via an estimation process, e.g. nonlinear regression. In this way, the measurement of a tag's location signal can determine both the tag position and the receivers' clock propagation delays simultaneously. The tag effectively acts as a wireless reference timing source but, unlike previous methods, this method does not require a-priori knowledge of the tag position.

If fresh values for the unknown clock propagation delays for each receiver are determined during one tag interrogation cycle using the above method, then these values can be stored for future use in a computing means such as the one used to perform the position estimation process.

Furthermore, measurements of receiver clock propagation delays taken during multiple tag interrogation cycles can be stored and averaged to obtain more accurate values, which can then be used to either directly alter the local clock at each receiver, or can be used in the position calculation stage to compensate for the offsets of the local clocks of each receiver. A range of other statistical techniques (e.g. outlier detection, trend analysis, etc.) can be applied to these calculated values to better estimate the true clock propagation delay for a receiver at any point in time. Note that clock propagation delays from different tag interrogation cycles must be aligned in some way before averaging or another statistical technique is used, because the tag transmission times for each interrogation cycle will be different and so the clock propagation delays will be referenced to different epochs. As the clock propagation delay for each receiver is determined relative to the time of transmission of the location signal from the tag, one technique by which the epochs can be realigned is computing the average clock propagation delay for receivers in each separate interrogation cycle and subtracting that average from all the clock propagation delays determined during that interrogation cycle. Assuming that the local clocks at each receiver are sufficiently stable and/or that the propagation delays of any timing reference signal do not vary significantly over a short period of time, then future calculations of tag positions using the measured data from receivers need only estimate the unknowns associated with the tag state, i.e. the tag x, y, and z coordinates and $t_t$, the time of transmission relative to some epoch. As mentioned previously, as the local clock propagation delay for each receiver is determined relative to the time of transmission of the location signal by the tag, and the tag time of transmission itself is not typically of interest. Hence, the details of the epoch to which the delay is referenced are typically not important. If n receivers detect the tag signal, there are only four unknowns and 3n measurements ($t_{a1} \ldots t_{an}$, $\theta_1 \ldots \theta_n$ and $\phi_1 \ldots \phi_n$), and there is then a substantial surplus of redundant information which can be used to make better estimates of the unknown tag position.

The extremes given above (where the measured data is used to estimate all the clock propagation delays of the receivers detecting a signal from the tag and where the measured data is used in conjunction with previously-determined clock propagation delays to compute only the tag position) represent opposite ends of a spectrum of possible estimation calculations, in which none, some or all of the receiver clock propagation delays may be reviewed. For example, suppose that receivers A and B have previously been used to determine a tag position, permitting receiver clock propagation delays $t_{pA}$ and $t_{pB}$ for those receivers to also be found and stored. Then, in a subsequent tag interrogation cycle, receivers A, B and C detect a tag position, providing three pulse times-of-arrival $t_{aA}$, $t_{aB}$ and $t_{aC}$, and six bearings $\theta_A$, $\theta_B$, $\theta_C$, $\phi_A$, $\phi_B$, and $\phi_C$. Using the known positions and orientations of the receivers A, B, and C, and the known values $t_{pA}$ and $t_{pB}$, it is possible to use the nine measured values to determine the five unknowns in the system (the tag x, y, and z coordinates and time of transmission $t_t$, and the unknown receiver clock propagation delay $t_{pC}$). Therefore, in this instance the unknown clock propagation delay is determined at the same time as a better estimate of the tag position (better, in a statistical sense that is), than would have been obtained if all the clock propagation delays were recalculated, because there are fewer unknowns to calculate from the same amount of data). Note that in this instance, it is necessary to estimate the tag time of transmission, because it is necessary to determine the receiver clock propagation delay $t_{pC}$ in the same epoch as that in which $t_{pA}$ and $t_{pB}$ were measured (so the three can be used together in TDOA calculations) rather than the epoch based on $t_t$.

A hybrid TDOA-AOA system of this nature, in which receiver clock propagation delays can be computed without a fixed reference during normal operation of the system, also has advantages over a pure AOA location system. For example, the angular accuracy of a phased-array receiver is typically best when the incoming signal is arriving along the boresight of the array. Therefore, if a receiver indicates that the incoming signal is arriving on a direction well off the sensor boresight, it can be assumed that the angular accuracy of the measurement will be somewhat degraded, although any time-of-arrival recorded by the receiver should still be accurate. Because the clock propagation delays in the system have previously been determined and stored during normal system operation, it is then possible to discard some or all of the angular information and rely more heavily on the TDOA information. (In the extreme where all angular information is discarded, of course, the location process is then a pure TDOA system.)

There is a 2D analog to this method, for use in TDOA-AOA systems where the position of a tag in a 2D plane is to be found and where each receiver unit only returns a single bearing for the tag. In these cases, each receiver detecting the signal from a tag reports two measurements: the time-of-arrival $t_a$ of the tag signal at the receiver and a bearing for the tag in the plane ($\theta$). The unknowns in the system are the tag x and y coordinates and one unknown (the unknown local clock propagation delay $t_p$ relative to the tag time-of-transmission) associated with each receiver. Therefore, if n receivers detect the signal from the tag, there are a total of 2n measurements ($t_{a1} \ldots t_{an}$, $\theta_1 \ldots \theta_n$) and a total of n+2 unknowns, and so both the tag position and clock propagation delays for each receiver can be determined simultaneously by the above method if n>=2.

Embodiments of the invention may be advantageously implemented in hybrid location systems that are capable of estimating the location of a device such as a tag using more than one location method, for example, hybrid location systems capable of estimating the location of a device using both time-difference-of-arrival and angle-of-arrival schemes. In particular, the location system should preferably be able to derive sufficient information from the received location signal to enable it to calculate all of the unknowns It should be noted that this invention cannot be applied to or be embodied by pure TDOA location systems, e.g. three unknowns (the x, y, and z coordinates) associated with the device to be located and one unknown (the unknown local clock offset $t_p$, relative to the tag time-of-transmission) associated with each receiver.

One possible embodiment of the invention is described below. This is for the purposes of example only and it should be understood that the invention is not limited to any specific embodiment or implementation.

Figure 1:
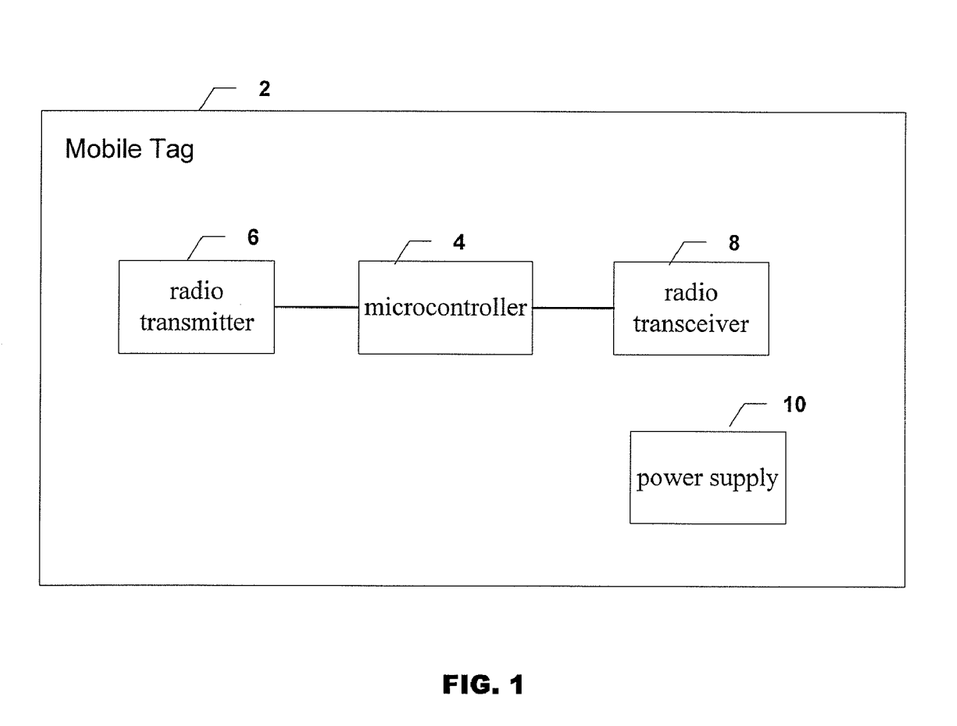
FIG. 1 shows a tag for transmitting location signals to a location system.

A mobile tag is shown in FIG. 1. The tag (2) includes a microcontroller (4), which could be a microcontroller PIC16LF877A made by Microchip Inc., a radio transmitter (6), which could be a UWB (ultrawideband) radio transmitter, such as the one implemented in a Ubisense Tag, available from Ubisense Limited, and a radio transceiver (8), which could be a CC1020 radio transceiver made by Chipcon S.A. Each tag has a unique 32-bit identifier and a battery-derived power supply (10). The microcontroller (4) controls the settings on the radio transceiver (8), decodes signals detected by that transceiver and its control program features a state machine which determines the behaviour of the tag.

Figure 2:
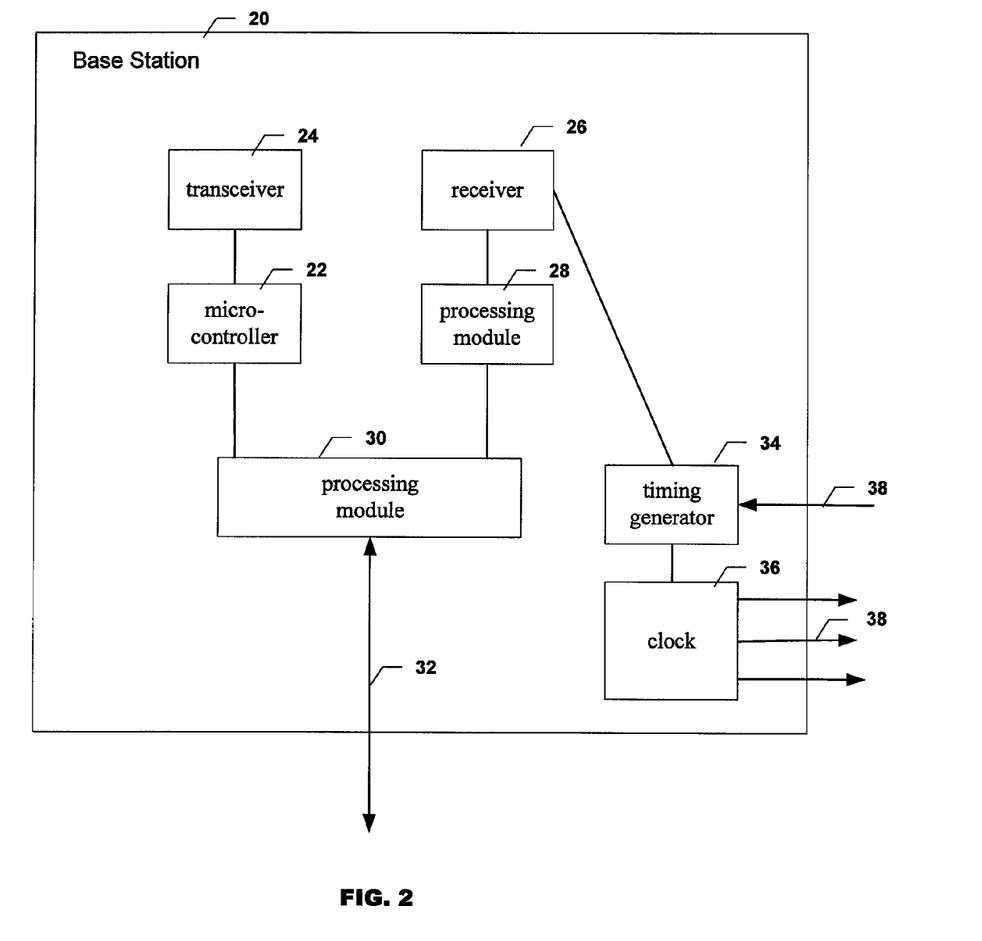
FIG. 2 shows a base station for a location system.

A base station is shown in FIG. 2. The base station (20) includes a microcontroller, which could be a PIC16LF877A microcontroller made by Microchip Inc. (22), a radio transceiver, which could be a CC1020 conventional radio transceiver (24) made by Chipcon S.A., a receiver, which could be a UWB receiver (26), such as the one implemented in a Ubisense sensor, available from Ubisense Limited, a processing module, which could be a DSPBlok21161 (28) made by Danville Signal Processing Limited and a further processing module (30), which could be an FS20 made by Forth Systems GmbH. The UWB receiver (26) can determine the time-of-arrival of an incoming UWB signal relative to a timing generator (34) and can generate bearings in azimuth and elevation indicating the direction of the source of the incoming UWB signal. The PIC microcontroller (22) controls the settings on the conventional radio transceiver and decodes signals detected by that transceiver. The timing generator (34) can be synchronised either from a local crystal clock (36) or via a remote clock over a wired timing network (38). The local crystal clock (36) can act as a source of the signal on the wired timing network (38).

Figure 3:
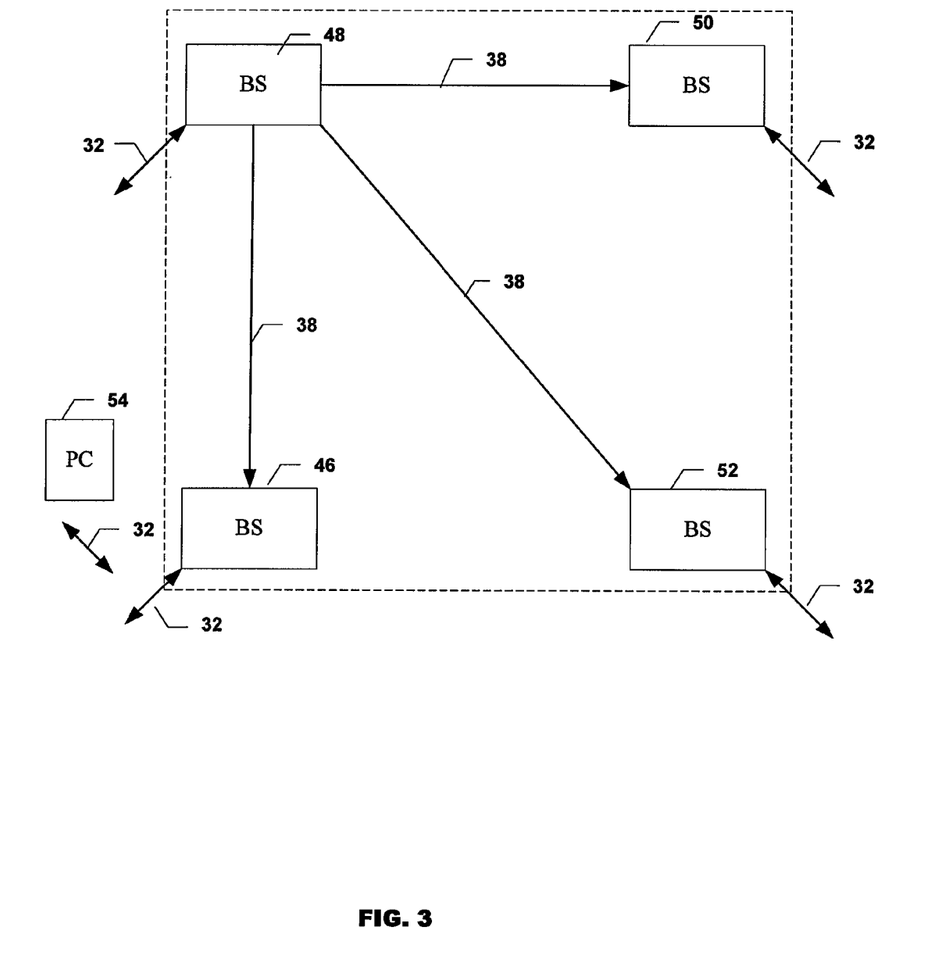
FIG. 3 shows the organisation of a location system.

A location system is shown in FIG. 3. The location system uses four base stations (46,48,50,52) to provide coverage of an area of space, which could be e.g. 15 m×15 m. A central controller (54) consisting of a networked PC controls the overall operation of the location system. The PC (54) and all base stations are connected via a standard Ethernet network (32) and control messages are sent by the PC (54) to the base stations over this network. The FS20 module (30) of each base station is connected to the Ethernet network (32) and acts as the network interface for the base station.

A timeslotted structure is imposed on the conventional and UWB channels within the system. Timeslots are 25 ms long and in the normal operation of the system one base station is designated the 'master' base station. The master base station acts as a transmitter of conventional radio messages from the infrastructure to tags and its local clock (36) is used to generate a timing signal which is distributed to other base stations over the timing cable network (38). During each timeslot, a message can be sent from the master base station to tags over the conventional radio link, and there are two opportunities for tags to send a message to base stations over the conventional radio link. A tag can also send a UWB signal in the timeslot for reception by the base stations. All base stations are capable of receiving conventional radio messages and UWB signals from tags.

When a particular tag sends a UWB transmission in a timeslot, it also transmits a message containing its unique identifier over the conventional radio channel so that the source of the UWB transmission can be identified. The UWB receiver (26) of a base station (20) detects the positioning signal and passes it to the DSPBlok processing module (28) for extraction of time-of-arrival (relative to the timing generator (34)) and azimuth/elevation bearings. The conventional radio transceiver (24) of the base station detects the message containing identification information and passes these signals on for decoding by the base station's PIC microcontroller (22). The information gathered by the base station from the signals on the UWB and conventional radio channels is passed by the DSPBlok (28) and PIC microcontroller (22) to the base station's FS20 network interface module (30), and from there it is sent to the master base station over the Ethernet network (32).

After the master base station has collected all the information relevant to a particular timeslot, its FS20 (30) processing module sends the information to the master base station's DSPBlok (28), The DSPBlok (28) then attempts to use bearing and time-of-arrival readings from multiple base stations, and the known blase station positions and orientations to compute both the tag's 3D position and the clock propagation delays associated with the distribution of the master base station's local clock (36) to the other base stations via the timing network (38). The process used to compute the unknown parameters is nonlinear regression, which is well known to those versed in the state-of-the-art.

If the computation is successful, the position and tag identification information is passed back to the master base station's FS20 module (30), which transmits them over the Ethernet network (32) to the controlling PC (54).

The computed clock propagation delays may then be stored for use in subsequent tag location cycles. The values may be stored directly in the master base station's DSPBlok (28), or they may be passed back for storage in the master base station's FS20 module (30). They may also be passed back over the Ethernet network (32) to the controlling PC (54), where the values can be stored more permanently on a hard disk or other long-term storage device. The values can then be returned over the network to the master's FS20 module and DSPBlok (28) at some future time. This feature is particularly useful where the location equipment is only to be powered up intermittently and the clock propagation delays are not expected to change significantly over a short period of time. Statistical techniques (e.g. averaging) can be applied to multiple sets of clock propagation delays taken during different tag location cycles at any of the points in the system (e.g. at the master base station's DSPBlok (28) or FS20 module (30), or at the controlling PC (54)).

In the specific embodiments described above, the clock delay information derived from location signals received from a device to be located was used primarily to calculate the location of the device. However, the clock delay information may also be used to update the clock of each receiver.

The receiver clock may be a component of the receiver itself (e.g. an oscillator), or it may be provided by a reference clock that is not located within the receiver itself. For example, a receiver may be clocked by a clock signal provided by a reference clock. The reference clock could be located in one of the other receivers of the system. If the receiver is clocked from an external source, then a delay is introduced into the "clock" of the receiver due to the time it takes for the clock signal to travel from the reference clock to the receiver. This is similar to the situation in which the receiver clock is periodically updated by an external timing reference signal from a central clock, in which case the transmission delay introduced into the timing reference signal causes a timing offset to be introduced into the clock of the receiver.

When the receiver is clocked by a clock signal, the "clock" of the receiver may be updated using the clock delay information. For example, a delay line could be implemented by means of which the receiver could obtain a corrected clock signal. The delay line could be implemented by a series of latches or simply a coil of wire that is tapped at intervals along its length. The appropriate output signal from the delay line may then be selected by means of a demultiplexor.

The invention has been primarily described with reference to a location system in which the location of a device is determined by multiple base units, each having a receiver for receiving location signals from the device and determining the time-of-arrival and angle-of-arrival of those location signals. However, the invention may also be implemented in a location system in which it is the base units that transmit the location signals, which are then received by the device to be located. The device may determine the time-of-arrival and the angle-of-arrival of the location signals received from each of the base units. The base units are preferably synchronised such that each base unit transmits its location signal at the same time or so that each base unit transmits its respective location signal at a predetermined time interval from the other base units. However, as is the case with the inverse system described previously (whereby the device to be located emits signals to a set of base receiver units) it will be difficult to arrange for the distributed clocks to be precisely synchronised, and therefore the methods described in this application for determining the offsets of each clock (or the propagation delays of an external timing reference signal to each receiver) during normal system operation will be advantageous. Preferably, the location signals each include an identifier that identifies which of the base units transmitted the signal.

The device may determine its location itself using data stored within the device itself concerning the locations of the base units from which location signals were received. Alternatively, the device may request the locations of the base units from which it has received location signals from an external source (e.g. one of the base units). As a further option, the device may transmit its time-of-arrival and angle-of-arrival data to an external unit for calculating the location of the device (e.g. one of the base units).

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A location system comprising:
    a plurality of base units at known locations for enabling the locating of a device by means of one or more location signals communicated between the device and the base units; and
    signal processing equipment configured to:
    (i) determine the location of the device in dependence on the time-difference-of-arrival and angle-of-arrival of the location signal(s) as received by the base units; and
    (ii) derive calibration data for calibrating the clocking of each base unit from the time-difference-of-arrival and angle-of-arrival of the location signal(s) as received by the base units, wherein
    the signal processing unit is configured to derive the calibration data independently of any reference timing generator that is external to a subsystem consisting of the plurality of base units and the device, and
    the calibration data defines a timing offset in the clocking of each base unit relative to a reference clock.

2. The location system as claimed in claim 1, wherein the location system is configured to receive location signal(s) as a time-varying waveform, and the location signal(s) used to determine the location of the device and the location signal(s) used to derive the calibration data are contemporaneous parts of the waveform.

3. The location system as claimed in claim 1, wherein at least one of the base units comprises a central clock and each base unit receives a timing signal from the central clock for clocking the base unit.

4. The location system as claimed claim 1, wherein one of the base units is arranged to derive the calibration data and to determine the position of the device in dependence on the derived calibration data.

5. The location system as claimed in claim 1, wherein each base unit comprises a respective clock and each base unit is arranged to calibrate the clocking of its respective clock in dependence on the calibration data.

6. The location system as claimed in claim 1, wherein
    the signal processing equipment is arranged to determine an average timing offset for a base unit from successive location signals communicated between the device and the base unit, and
    the base unit is arranged to calibrate its clocking in dependence on the average offset.

7. The location system as claimed in claim 1, wherein each base unit comprises a timing generator and is arranged to determine the time-of-arrival of one or more location signal(s) as received by the base unit.

8. The location system as claimed in claim 7, wherein the signal processing equipment is arranged to determine the location of the device in dependence on the time of arrival of the one or more location signals at each of the base units and the timing offset in the clocking of each base unit as defined by the calibration data.

9. The location system as claimed in claim 7, wherein the signal processing equipment is arranged to store calibration data derived from a location signal communicated at a first point in time and to determine the location of a device at a second, subsequent point in time in dependence on the timing offsets defined by the stored calibration data and the manner in which one or more location signals communicated at the second point in time is/are received.

10. The location system as claimed in claim 1, wherein the base units are arranged to determine the angle-of-arrival of one or more location signal(s) as received by the base units.

11. A method for locating a device in a location system comprising the device and a plurality of base units at known positions for enabling the locating of the device, the method comprising the steps of:
    communicating one or more location signals between the device and the base units;
    determining the location of the device in dependence on the time-difference-of-arrival and angle-of-arrival of the location signal(s) as received by the base units; and
    deriving calibration data for calibrating the clocking of each base unit from the time-difference-of-arrival and angle-of-arrival of the location signal(s) as received by the base units, wherein
    the calibration data is derived independently of any reference timing generator external to a subsystem consisting of the base units and the device, and
    the calibration data defines a timing offset in the clocking of each base unit relative to a reference clock.

12. The method as claimed in claim 11, comprising clocking each base station by means of a timing signal provided by a central clock.

13. The method as claimed in claim 11, comprising calibrating the system in dependence on the calibration data.

14. The method as claimed in claim 11, comprising calibrating the clocking of each base unit in dependence on the calibration data.

15. The method as claimed in claim 11, comprising determining an average timing offset for a base unit from successive location signals communicated between the device and the base unit and calibrating the clocking of the base unit in dependence on the average offset.

16. The method as claimed in claim 11, comprising determining the time-of-arrival of one or more location signal(s) as received by the base units.

17. The method as claimed in claim 16, comprising determining the location of the device in dependence on the time of arrival of the one or more location signals at each of the base units and the timing offset in the clocking of each base unit as defined by the calibration data.

18. The method as claimed in claim 16, comprising storing calibration data derived from a location signal communicated at a first point in time and determining the location of a device at a second, subsequent point in time in dependence on the timing offsets defined by the stored calibration data and the manner in which one or more location signals communicated at the second point in time is/are received.

19. The method as claimed in claim 11, comprising determining the angle-of-arrival of one or more location signal(s) as received by the base units.

* * * * *